United States Patent
Oh et al.

(10) Patent No.: US 9,777,650 B2
(45) Date of Patent: Oct. 3, 2017

(54) SYSTEM AND METHOD FOR CONTROLLING VIBRATION OF ENGINE

(71) Applicant: Hyundai Motor Company, Seoul (KR)

(72) Inventors: Wan Soo Oh, Gyeonggi-do (KR); Seok Young Shin, Gyeonggi-do (KR); Heungseok Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 131 days.

(21) Appl. No.: 14/956,068

(22) Filed: Dec. 1, 2015

(65) Prior Publication Data

US 2017/0074195 A1 Mar. 16, 2017

(30) Foreign Application Priority Data

Sep. 16, 2015 (KR) ........................ 10-2015-0131193

(51) Int. Cl.
| | | |
|---|---|---|
| *F02D 41/16* | (2006.01) | |
| *F02D 41/02* | (2006.01) | |
| *F16F 15/131* | (2006.01) | |
| *F02D 31/00* | (2006.01) | |
| *F02D 41/14* | (2006.01) | |

(52) U.S. Cl.
CPC ......... *F02D 41/021* (2013.01); *F02D 31/008* (2013.01); *F02D 41/16* (2013.01); *F16F 15/131* (2013.01); *F02D 2041/1409* (2013.01)

(58) Field of Classification Search
CPC .. F02D 41/16; F02D 41/0097; F02D 41/1402; F02D 41/1497; F02D 41/021; F02D 31/008; F02D 2041/1409; F16F 15/131
See application file for complete search history.

(56) References Cited

FOREIGN PATENT DOCUMENTS

| JP | H09217639 A | 8/1997 |
|---|---|---|
| JP | 2002186108 A | 6/2002 |
| JP | 2010038065 A | 2/2010 |
| JP | 2010053804 A | 3/2010 |
| KR | 10-1999-055676 A | 7/1999 |
| KR | 10-2000-0025389 A | 5/2000 |
| KR | 10-1999-021648 A | 8/2000 |

*Primary Examiner* — Jacob Amick
(74) *Attorney, Agent, or Firm* — Brinks Gilson & Lione

(57) ABSTRACT

The present disclosure relates to a system for controlling vibration of an engine including an engine inertia portion which rotates together with the engine and a sub-inertia portion which influences a rotation speed of the engine and is separately provided, and a damper which is disposed between the engine inertia portion and the sub-inertia portion for reducing a vibration. The present disclosure includes: determining whether a vehicle is in an idle state; sensing rotation speeds of the engine inertia portion and the sub-inertia portion, respectively; calculating an average value of the rotation speeds of the engine inertia portion and the sub-inertia portion; calculating an error value from the average value; and PI controlling by receiving the error value.

9 Claims, 6 Drawing Sheets

SYSTEM AND METHOD FOR CONTROLLING VIBRATION OF ENGINE

CROSS-REFERENCE TO RELATED APPLICATION

This application claims priority to and the benefit of Korean Patent Application No. 10-2015-0131193 filed on Sep. 16, 2015, the entirety of which is hereby incorporated by reference.

FIELD

The present disclosure relates to system and method for controlling vibration of an engine.

BACKGROUND

The statements in this section merely provide background information related to the present disclosure and may not constitute prior art.

In general, a vehicle with a dual clutch transmission (DCT) or a dual mass flywheel (DMF) has an external damper. Such a vehicle may cause a certain amount of noise when the engine is in an idle state.

We have discovered, that in a driving system in which an engine inertia portion, e.g., a primary flywheel, is connected to a sub-inertia portion, e.g., a secondary flywheel, with a damper, when the engine is in the idle state, a rotation speed (RPM: rotations per minute) may be changed due to torque disturbance generated in the engine. Accordingly, a difference of rotation speed between the engine inertia portion and the sub-inertia portion may be generated, and a resonance may be caused by the difference of rotation speed. The resonance frequency being generated is typically about 9 Hz, and, as we have discovered, the resonance frequency may cause the noise in the vehicle. The vehicle has DCT or DMF provided with the damper.

Therefore, conventionally, a structural method which increases connecting torque between the engine and the flywheel or hysteresis may be provided for reducing the noise. Further, a controlling method which increases the rotation speed when the engine is in the idle state is also provided for reducing the noise.

However, we have discovered that the above structural method may worsen a booming noise since the vibration of the engine is directly transmitted when the vehicle is launching or driving.

Meanwhile, according to the above controlling method which increases the rotation speed when the engine is in the idle state, we have discovered that fuel consumption and overall noise of the vehicle may be deteriorated.

The conventional controlling method in the idle state is as follows.

When the engine is in a cool condition and the idle state and an external load is applied thereto, a driving system of the engine may be vibrated. Thus, required correcting torque and an amount of the engine fuel may be changed together.

When the external load is applied when the engine is in the idle state, the engine driving system may be torsionally vibrated at the resonance frequency region as described above. Referring to the FIGS. 5 and 6, a rotation speed curve y1 of the engine inertia portion and a rotation speed curve y2 of the sub-inertia portion are inverse to each other. Therefore, in the conventional controlling method for a driving system, we have discovered the system is continually vibrated since the noise signal generated by the vibration above is applied as an input signal. In other words, the resonance frequency influencing the engine is not removed but continues.

SUMMARY

The present disclosure provides a system that may include an engine inertia portion which rotates together with the engine and a sub-inertia portion which is separately provided in order influence a rotation speed of the engine and that is separately provided, and a damper which is disposed between the engine inertia portion and the sub-inertia portion for reducing a vibration. The system may include: an engine rotation speed sensor which senses a rotation speed of the engine inertia portion; a sub-rotation speed sensor which senses a rotation speed of the sub-inertia portion; and a control portion which receives each of the rotation speeds obtained from the engine rotation speed sensor and the sub-rotation speed sensor and stores signals which are converted from each of the rotation speeds, respectively. The control portion may control the rotation speed of the engine using an error value which is calculated by subtracting an average value, which is between each of the rotation speeds obtained from the engine rotation speed sensor and the sub-rotation speed sensor, from a predetermined engine rotation speed value in an idle state.

The error value may be inputted into a Proportional Integrative (PI) control.

The average value may be an arithmetic mean between each of the rotation speeds obtained by the engine rotation speed sensor and the sub-rotation speed sensor.

A method for controlling vibration of an engine may include an engine inertia portion which rotates together with the engine and a sub-inertia portion which is separately provided in order to influence a rotation speed of the engine, and a damper which is disposed between the engine inertia portion and the sub-inertia portion for reducing a vibration. The method for controlling vibration of the engine may include: determining whether a vehicle is in an idle state; sensing rotation speeds of the engine inertia portion and the sub-inertia portion, respectively; calculating an average value of the rotation speeds of the engine inertia portion and the sub-inertia portion; calculating an error value from the average value; and PI controlling by receiving the error value.

The error value may be obtained by subtracting the average value M from a predetermined engine rotation speed value in the idle state.

The method for controlling vibration of the engine may further include: adjusting required engine torque such that the engine is maintained at a predetermined rotation speed through the PI control; and adjusting an amount of fuel such that the engine is maintained at a predetermined rotation speed.

A rotation speed signal of the sub-inertia portion and a rotation speed signal of the engine inertia portion may be in an inverse phase from each other.

The predetermined engine rotation speed value may be plural depending on a driving condition.

The PI control may be realized as a plurality of modes depending on a driving condition.

As described above, according to one form of the present disclsoure, a vibration is suppressed without an additional structural vibration reduction device. Further, the vibration noise may be removed by changing a signal inputted into the PI control.

Further areas of applicability will become apparent from the description provided herein. It should be understood that the description and specific examples are intended for purposes of illustration only and are not intended to limit the scope of the rpesent disclosure.

DRAWINGS

In order that the disclosure may be well understood, there will now be described various forms thereof, given by way of example, reference being made to the accompanying drawings, in which.

Figure 1:
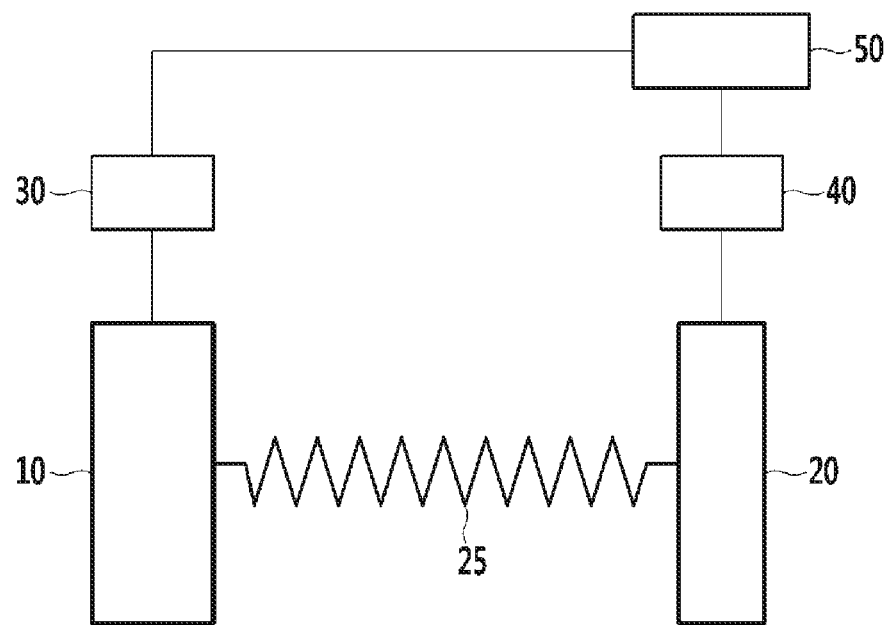
FIG. 1 is a block diagram illustrating a driving system of an engine according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the represent disclosure, application, or uses. It should be understood that throughout the drawings, corresponding reference numerals indicate like or corresponding parts and features.

Throughout the specification, unless explicitly described to the contrary, the word "comprise" and variations such as "comprises" or "comprising" will be understood to imply the inclusion of stated elements but not the exclusion of any other elements.

FIG. 1 is a block diagram illustrating a driving system of an engine according to one form of the present disclosure.

Referring to FIG. 1, an engine driving system according to one form of the present disclosure includes an engine inertia portion 10 which is connected to the engine, a sub-inertia portion 20 which has an influence on a rotation speed of the engine, and a damper 25 which is disposed between the engine inertia portion 10 and sub-inertia portion 20.

The engine inertia portion 10 is an element which rotates together with the engine and to which a vibration of engine is directly transmitted.

The sub-inertia portion 20 is one of multiple driving system elements which influence the rotation speed of the engine. The sub-inertia portion 20 may be moved together with the engine inertia portion 10. As an example of the sub-inertia portion 20, a flywheel or a transmission may be included.

The damper 25 is provided so as to reduce the vibration generated when driving torque of the engine inertia portion 10 is transmitted to any one of the driving system elements through sub-inertia portion 20. One side of the damper 25 is connected to the engine inertia portion 10, and the other side may be connected to the sub-inertia portion 20.

Accordingly, the driving system of the engine may be divided into the engine inertia portion 10 which is connected to the engine and is directly influenced thereby, and the sub-inertia portion 20 which may indirectly influence the engine rotation. When the vehicle is in the idle state, the engine inertia portion 10 is disconnected from a power delivery device, such as a transmission. Thus, the only element which influences the resonance of the engine is the sub-inertia portion 20.

Meanwhile, the driving system of the engine according one aspect of the present disclosure further includes an engine rotation speed sensor 30 measuring rotation speed of the engine inertia portion 10, a sub-rotation speed sensor 40 measuring rotation speed of the sub-inertia portion 20, and a control portion 50 which controls by converting each rotation speed into a signal. The control portion 50 is a processor, computer, logic circuit or the like that is capable of receiving and computing data as described herein.

Figure 6:
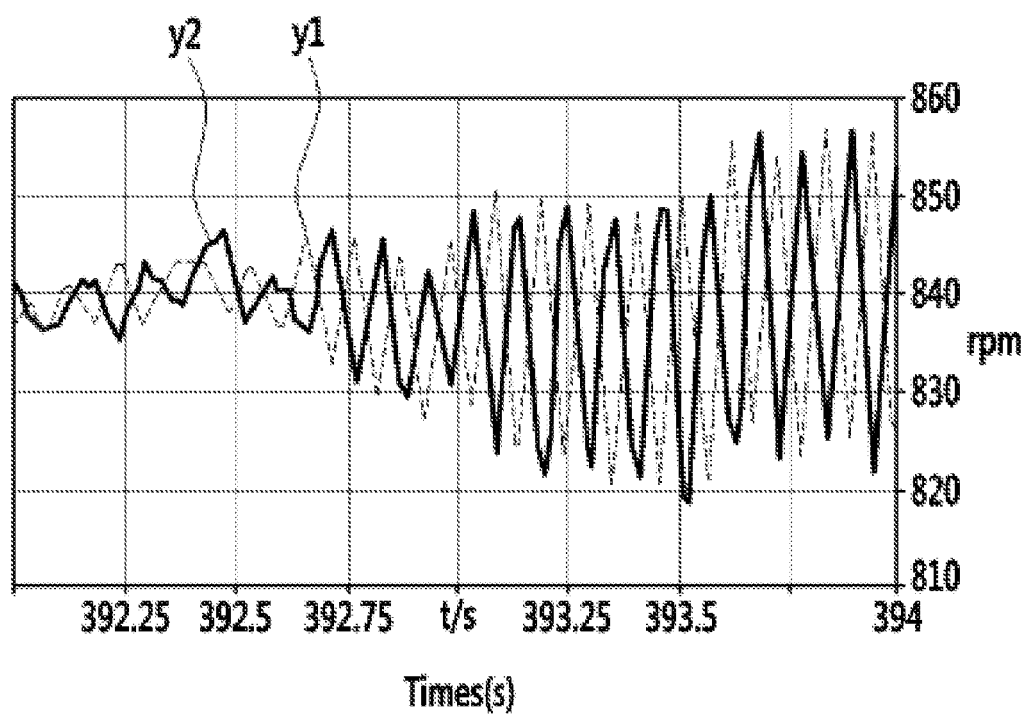
FIG. 6 is a graph illustrating an enlarged region "B" of FIG. 5.

As shown in FIG. 6, the signals of the engine inertia portion 10 and the sub-inertia portion 20 typically have a reverse phase from each other. We have discovered that in the conventional art, the resonance frequency of the rotation speed of the engine is about 9 Hz due to a phase difference between the engine inertia portion 10 and the sub-inertia portion 20. Thus, the engine has a vibration and a noise in the resonance frequency region.

According to one form of the present disclosure, in the idle state of the vehicle, each rotation speed of the engine inertia portion 10 and the sub-inertia portion 20 is converted to a signal by the engine rotation speed sensor 30 and sub-rotation speed sensor 40, and an average value M is calculated.

The average value M may be calculated by dividing a sum of each of the rotation speeds of the engine inertia portion 10 and the sub-inertia portion 20. On the other hand, the average value M may be calculated by dividing from a sum of each displacement of the engine rotation speed sensor 30 and sub-rotation speed sensor 40. In the present form, the average value may be calculated by using an arithmetic mean, a geometric mean, a harmonic mean, or the like.

Hereinafter, a method of calculating the average value by dividing a sum of the rotation speed of the engine inertia portion 10 and the sub-inertia portion 20 will be described.

Since each sensed signal of the rotation speed of the engine inertia portion 10 and sub-inertia portion 20 typically has a reverse phase from the other, eventually, it affects the rotation speed of the engine as a noise signal.

For removing the noise signal, the control portion 50 according to one form of the present disclosure calculates an error value by subtracting the average value M from a predetermined engine rotation speed value P in the idle state. The predetermined engine rotation speed value P in the idle state may include a plurality of predetermined values depending on a driving condition.

The error value E may be used as an input signal of proportional integral control (PI control) which controls the rotation of the engine. The PI control which controls the rotation of the engine may generally use an idle governor type to decrease the error value E. However, the error value E which is inputted is determined such that the value of the noise signal is removed.

For example, if the rotation speed of the engine inertia portion 10 is 850 rpm and the rotation speed of the sub-inertia portion 20 is 825 rpm, the average value M of the rotation speed is 837.5 rpm. Therefore, if the predetermined engine rotation speed value P is 837 rpm in the idle state, the error value E is 0.5 rpm.

However, if the average value M is not subtracted, then the error value E is calculated by subtracting the rotation speed of 850 rpm of the engine inertia portion 10 from the predetermined engine rotation speed value P of 837 rpm in the idle state. Accordingly, the error value becomes 13 rpm. This error value is inputted into the PI control and the noise signal affects the PI control. Thus, the correcting torque of the engine and the amount of the engine fuel may be considerably changed by the PI control.

After the process of the PI control, the torque required for maintaining the predetermined rotation speed of the engine in the idle state and the amount of the fuel are adjusted for preventing vibration and removing the noise.

Thereby, according to one form of the present disclosure, the vibration and the noise may be effectively reduced by amending the input signal without an additional noise reduction device.

Hereinafter, each step of controlling the engine will be described in detail.

Figure 2:
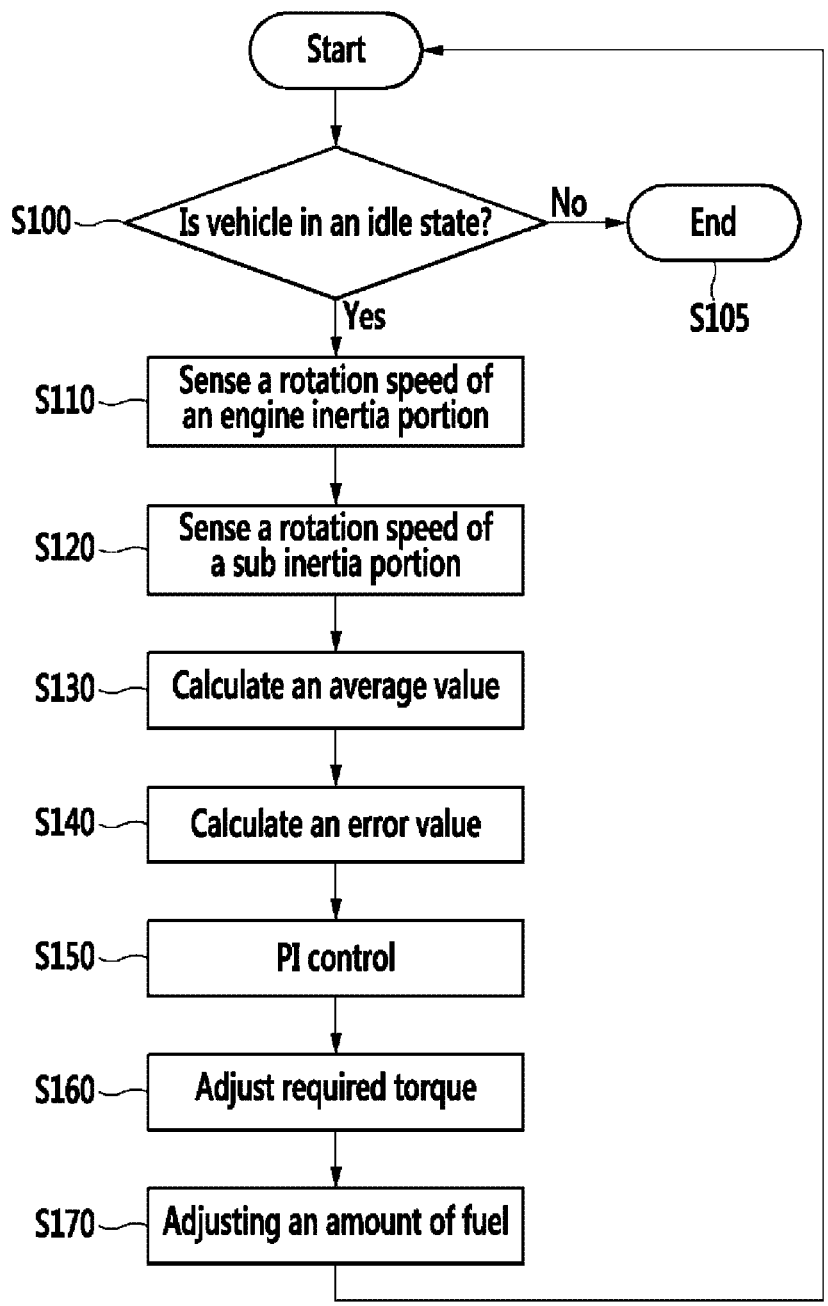
FIG. 2 is a flowchart illustrating a controlling method of an engine according to an exemplary form of the present disclosure.
Figure 3:
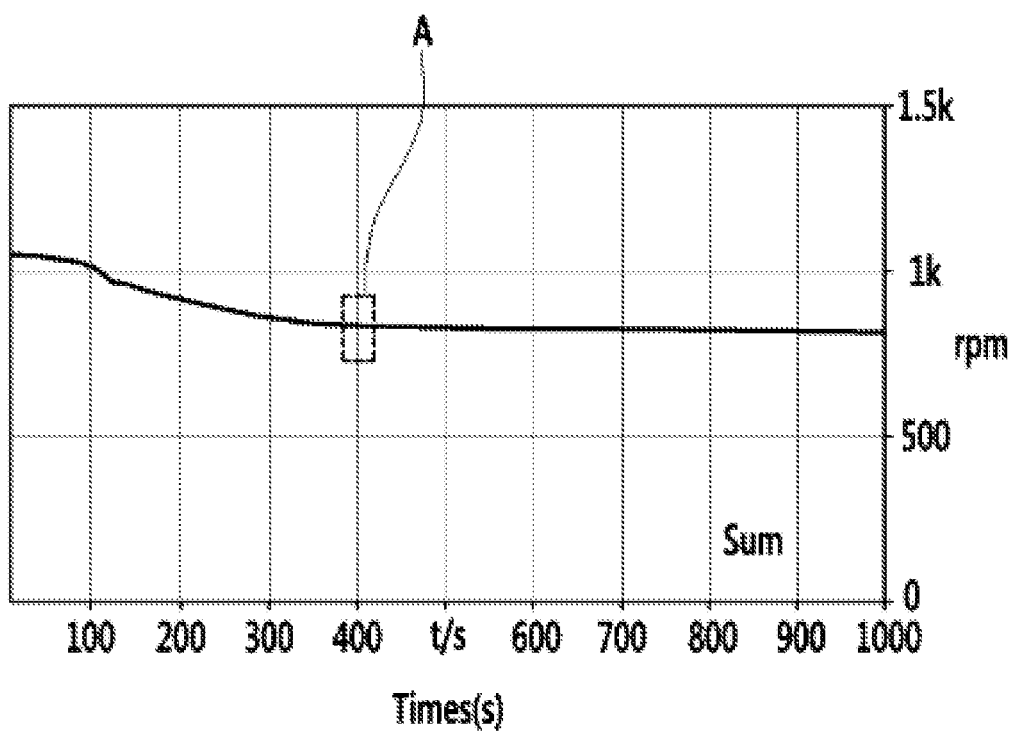
FIG. 3 is a graph illustrating a rotation speed of an engine according to an exemplary form of the present disclosure.
Figure 4:
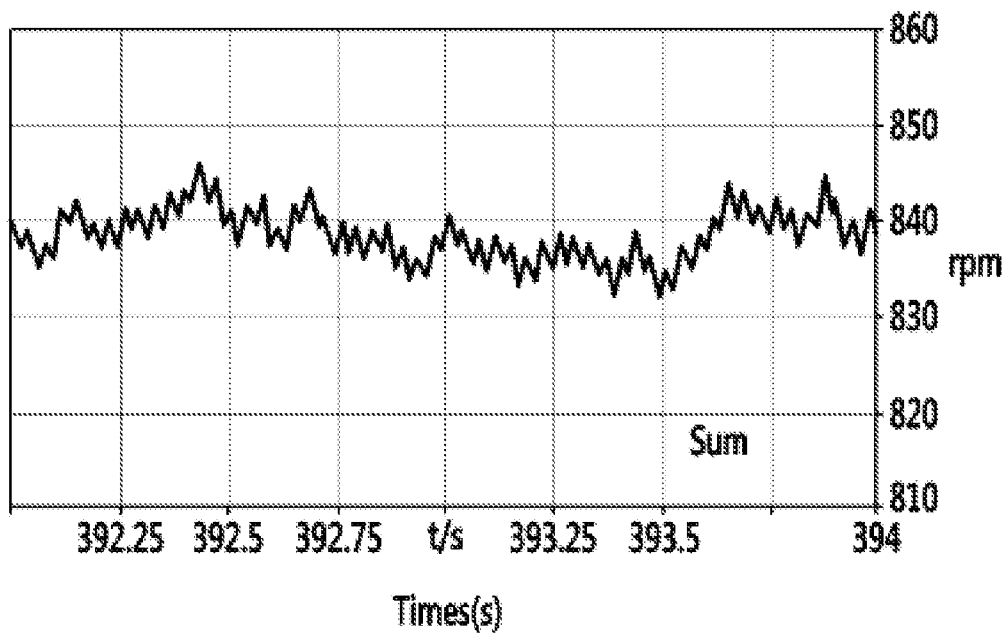
FIG. 4 is a graph illustrating an enlarged region "A" of FIG. 3.
Figure 5:
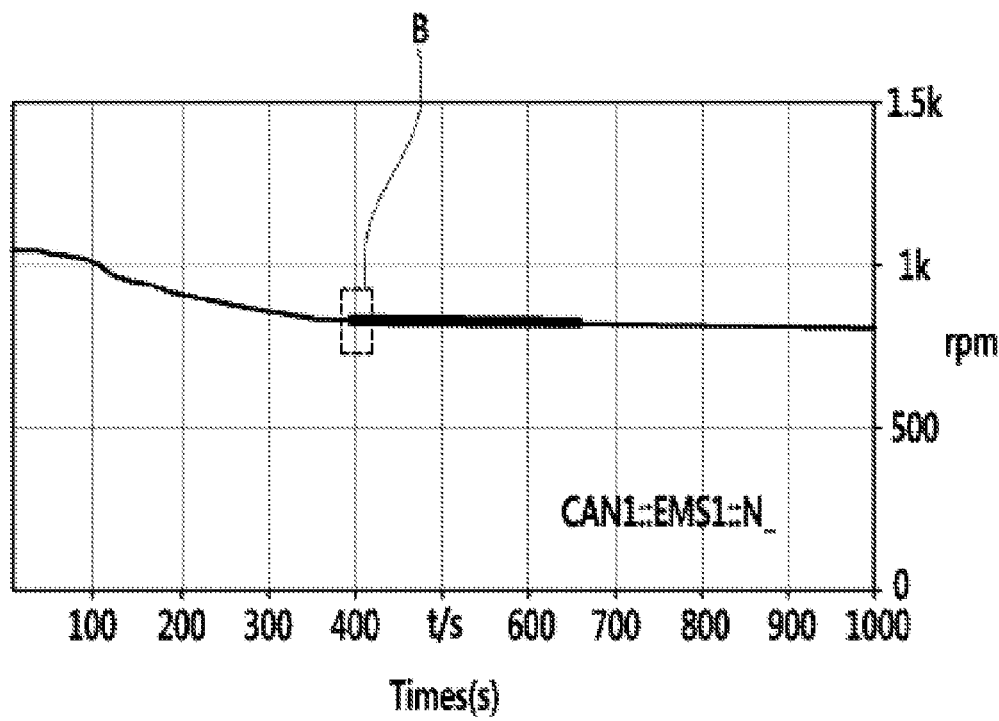
FIG. 5 is graph showing occurrence of a resonance according to a prior controlling method of an engine.

FIG. 2 is a flowchart illustrating a controlling method of an engine according to one form of the present disclosure, FIG. 3 is a graph illustrating a rotation speed of an engine according to a form of the present diclosure, FIG. 4 is an enlarged graph of region "A" of FIG. 3, FIG. 5 is graph showing occurrence of a resonance according to a prior controlling method of an engine, and FIG. 6 is an enlarged graph of region "B" of FIG. 5.

Referring to FIG. 2, in the method for controlling the engine according to one form of the present disclosure, first, it is determined whether the vehicle is in an idle state (S100).

Here, when an accelerator pedal position sensor (APS) is off, a vehicle speed is zero (0), or a temperature of a coolant is constant, then it is determined that the vehicle may be in the idle state, but it is not limited thereto. In S100, if the vehicle is not in the idle state, the method for controlling the engine according to one form of the present disclosure is terminated.

If the vehicle is in the idle state, the control portion 50 receives a rotation speed sensed from the engine rotation speed sensor 30, and the rotation speed is converted and inputted as an engine rotation speed signal RPM1 (S110).

Next, the control portion 50 inputs a sub-rotation speed signal RPM2 by receiving a rotation speed of the sub-inertia portion 20 being sensed by the sub-rotation speed sensor 40 (S120).

As described above, the engine rotation speed signal RPM1 and the sub-rotation speed signal RPM2 typically have reverse phases from each other.

In S130, the control portion 50 calculates the average value M of the engine rotation speed signal RPM1 and the sub-rotation speed signal RPM2 by receiving them from the engine inertia portion 10 and the sub-inertia portion 20, respectively. The calculated average value M is a value including an engine rotation speed and a noise signal. The average value M may be an arithmetic mean, and it is obtained by an equation as follows.

$$\text{average value } M = (\text{engine rotation speed} + \text{sub-rotation speed})/2 \quad \text{Equation:}$$

In S140, as described above, the control portion 50 calculates the error value E as a result value by subtracting the average value M from a predetermined engine rotation speed value P in the idle state. The predetermined engine rotation speed value P may be variable depending on the vehicle condition when the vehicle is in the idle state.

In S150, deviation of the rotation speed of the engine which is generated by the torque disturbance is minimized through the PI control, which is performed by a proportional and integral operation. At this time, the error value E calculated is the input signal of the PI control. The PI control may include a plurality of modes depending on the driving condition.

In S160, the torque required for maintaining the predetermined rotation speed of the engine in the idle state is adjusted, and the amount of the fuel is adjusted in S170.

Accordingly, the error value E from which the noise signal is removed is calculated by subtracting the average value M which is the mean value between the engine rotation speed signal RPM1 and the sub-rotation speed signal RPM2 from a predetermined engine rotation speed value P in the idle state.

This error value E is provided as the input signal of the PI control, as shown in FIG. 4, and the rotation speed of the engine is controlled by the error value E from which the noise is removed. In other words, according to one aspect of the present disclosure, the noise corresponding to a phase difference between a rotation speed curve y1 of the engine inertia portion 10 and a rotation speed curve y2 of the sub-inertia portion 20 may be reduced.

Further, the vibration noise signal being generated by the resonance of the engine driving system may be effectively reduced without any additional motor or actuator.

The description of the disclosure is merely exemplary in nature and, thus, variations that do not depart from the substance of the disclosure are intended to be within the scope of the disclosure. Such variations are not to be regarded as a departure from the spirit and scope of the disclosure.

<Description of symbols>

| | |
|---|---|
| 10: engine inertia portion | 20: sub-inertia portion |
| 30: engine rotation speed sensor | 40: sub-rotation speed sensor |
| 50: control portion | |

What is claimed is:

1. A system for controlling vibration of an engine, including an engine inertia portion which rotates together with the engine and a sub-inertia portion which is separately provided in order to influence a rotation speed of the engine, and a damper which is disposed between the engine inertia portion and the sub-inertia portion for reducing a vibration, comprising:

an engine rotation speed sensor which senses a rotation speed of the engine inertia portion;

a sub-rotation speed sensor which senses a rotation speed of the sub-inertia portion; and a control portion which receives each of the rotation speeds obtained from the engine rotation speed sensor and the sub-rotation speed sensor and stores signals which are converted from each of the rotation speeds, respectively, wherein the control portion is configured to control the rotation speed of the engine using an error value which is calculated by subtracting an average value which is between each of the rotation speeds obtained from the engine rotation speed sensor and the sub-rotation speed sensor, from a predetermined engine rotation speed value in an idle state.

2. The system for controlling vibration of an engine of claim 1, wherein the error value is inputted into a Proportional Integral (PI) control.

3. The system for controlling vibration of an engine of claim 2, wherein the average value is an arithmetic mean between each of the rotation speeds obtained by the engine rotation speed sensor and the sub-rotation speed sensor, respectively.

4. A method for controlling vibration of an engine including an engine inertia portion which rotates together with the engine and a sub-inertia portion which is separately provided in order to influence a rotation speed of the engine, and a damper which is disposed between the engine inertia portion and the sub-inertia portion for reducing a vibration, comprising:
- determining whether a vehicle is in an idle state;
- sensing a rotation speed of the engine inertia portion and a rotation speed of the sub-inertia portion;
- calculating an average value of the rotation speeds of the engine inertia portion and the sub-inertia portion;
- calculating an error value from the average value; and
- operating Proportional Integral (PI) control based on the error value.

5. The method for controlling vibration of an engine of claim 4, wherein the error value is obtained by subtracting the average value from a predetermined engine rotation speed value in the idle state.

6. The method for controlling vibration of an engine of claim 5, further comprising:
- adjusting required engine torque such that the engine is maintained at a predetermined rotation speed through the PI control; and
- adjusting an amount of fuel such that the engine is maintained at a predetermined rotation speed.

7. The method for controlling vibration of an engine of claim 4, wherein a rotation speed signal of the sub-inertia portion and a rotation speed signal of the engine inertia portion are inverse from each other.

8. The method for controlling vibration of an engine of claim 5, wherein the predetermined engine rotation speed value is plural depending on a driving condition.

9. The method for controlling vibration of an engine of claim 5, wherein the PI control is realized as a plurality of modes depending on a driving condition.

* * * * *